United States Patent
Cheng et al.

(10) Patent No.: US 12,346,507 B2
(45) Date of Patent: Jul. 1, 2025

(54) STYLUS CONTROL CIRCUIT AND STYLUS

(71) Applicant: NOVATEK Microelectronics Corp., Hsin-Chu (TW)

(72) Inventors: Hao-Wei Cheng, Tainan (TW); Chin-Lin Lee, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/098,122

(22) Filed: Jan. 18, 2023

(65) Prior Publication Data
US 2023/0236677 A1 Jul. 27, 2023

Related U.S. Application Data

(60) Provisional application No. 63/303,510, filed on Jan. 27, 2022.

(51) Int. Cl.
*G06F 3/0354* (2013.01)
(52) U.S. Cl.
CPC .............................. *G06F 3/03545* (2013.01)
(58) Field of Classification Search
CPC ............... G06F 3/04162; G06F 3/0441; G06F 2203/04108; G06F 3/03545; G06F 3/04166; G06F 3/0383; G06F 3/041–044
See application file for complete search history.

(56) References Cited

U.S. PATENT DOCUMENTS

| | | | |
|---|---|---|---|
| 2015/0324029 A1 | 11/2015 | Bakken | |
| 2019/0102021 A1 | 4/2019 | Jang | |
| 2019/0129569 A1* | 5/2019 | Chou | G06F 3/04166 |
| 2019/0179475 A1* | 6/2019 | Seo | G06F 3/0442 |
| 2020/0081552 A1* | 3/2020 | Gur | G06F 3/0441 |
| 2020/0210021 A1* | 7/2020 | Ju | G06F 3/0442 |
| 2021/0405847 A1* | 12/2021 | Choi | G06F 3/0446 |
| 2023/0084559 A1* | 3/2023 | Choi | G06F 3/04162 |
| | | | 345/174 |

FOREIGN PATENT DOCUMENTS

TW 202016714 A 5/2020

* cited by examiner

*Primary Examiner* — Temesghen Ghebretinsae
*Assistant Examiner* — Ivelisse Martinez Quiles
(74) *Attorney, Agent, or Firm* — Winston Hsu

(57) ABSTRACT

A stylus control circuit used to control a stylus includes a positioning signal generator. The positioning signal generator is used to generate a first positioning signal having a first frequency and transmit the first positioning signal to the stylus through a first positioning transmission electrode. Wherein, the first frequency corresponds to a position of the first positioning transmission electrode, and the first positioning signal is a frequency signal without carrying any digital data.

8 Claims, 9 Drawing Sheets

STYLUS CONTROL CIRCUIT AND STYLUS

CROSS REFERENCE TO RELATED APPLICATIONS

This application claims the benefit of U.S. Provisional Application No. 63/303,510, filed on Jan. 27, 2022. The content of the application is incorporated herein by reference.

BACKGROUND OF THE INVENTION

1. Field of the Invention

The present invention relates to a stylus control circuit and a stylus, and more particularly, to a stylus control circuit for positioning of a hovering stylus and the related stylus.

2. Description of the Prior Art

An active stylus is a common peripheral device used for an electronic device having a touch panel, such as a mobile phone or laptop. In general, the touch panel includes multiple sensing electrodes, which may be integrated in or implemented on the touch panel and configured with finger touch sensing and stylus control functions. The active stylus may send downlink control signals and receive uplink control signals through touch sensing electrodes of the touch panel.

However, the received downlink signal strengths at the touch panel are quite weak when the active stylus is hovering (i.e., the active stylus does not contact the touch panel) and far from the touch panel, and the sensing electrodes of the touch panel are able to receive the downlink signals with enough signal strength and the control circuit may accurately calculate the stylus position only when the active stylus is hold close enough to the touch panel.

SUMMARY OF THE INVENTION

It is therefore an objective of the present invention to provide a novel stylus control circuit for positioning of a hovering stylus and the related stylus, in order to solve the abovementioned problem.

An embodiment of the present invention discloses a stylus control circuit used to control a stylus. The stylus control circuit comprises a positioning signal generator, which is used to generate a first positioning signal having a first frequency and transmit the first positioning signal to the stylus through a first positioning transmission electrode. Wherein, the first frequency corresponds to a position of the first positioning transmission electrode, and the first positioning signal is a frequency signal without carrying any digital data.

Another embodiment of the present invention discloses a stylus, which is used to interact with a plurality of positioning transmission electrodes. The stylus comprises a receiver and a demodulation circuit. The receiver is used to receive an uplink signal carrying a plurality of positioning signals which are transmitted from the plurality of positioning transmission electrodes. The demodulation circuit, coupled to the receiver, is used to demodulate the uplink signal to generate at least one positioning signal among the plurality of positioning signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
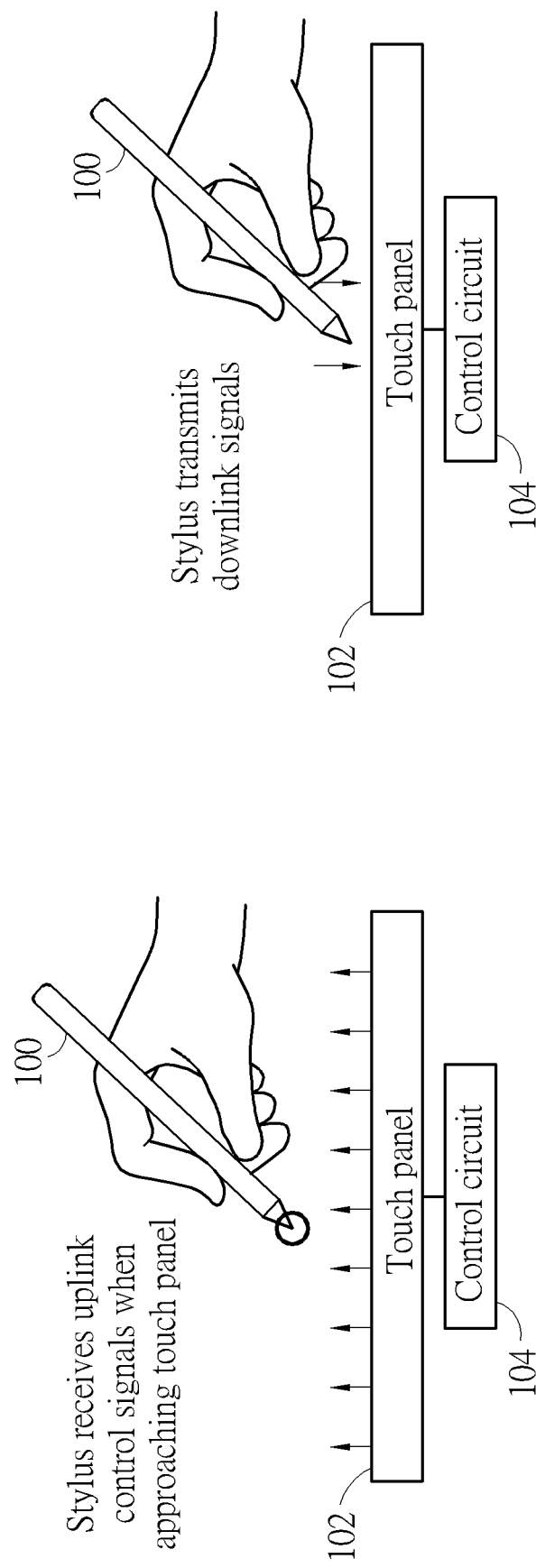
FIG. 1 illustrates the interaction of an active stylus and a touch panel.

FIG. 1 illustrates the interaction of an active stylus 100 and a touch panel 102. The active stylus 100 and the touch panel 102 may perform bi-directional communications, where the touch panel 102 may send uplink control signals to the active stylus 100 through touch sensing electrodes, and the active stylus 100 may send downlink signals to the touch sensing electrodes of the touch panel 102. The bi-direction communications provide more functions and conveniences for the user. The touch panel 102 may be controlled by a control circuit 104 such as a touch/stylus control circuit. The touch/stylus control circuit may be implemented as an independent touch sensor chip or may be integrated with a display driver to realize a touch and display driver integration (TDDI) circuit.

The uplink control signals may carry commands that the control circuit 104 needs to send to the active stylus 100, and the downlink signals may carry commands that the active stylus 100 needs to send to the control circuit 104. The commands in the uplink control signals and the downlink signals are usually encoded before being sent. When the active stylus 100 approaches the touch panel 102, the active stylus 100 may receive the uplink control signals and react based on indications of the commands, such as switching the operation mode or setting the operation frequency. The active stylus 100 then sends the downlink signals to the touch panel 102, where the capacitance sensed by the touch sensing electrodes may appear a variation when the downlink signals are received. The control circuit 104 then decodes the downlink signals to obtain the commands carried in the downlink signals.

Figure 2:
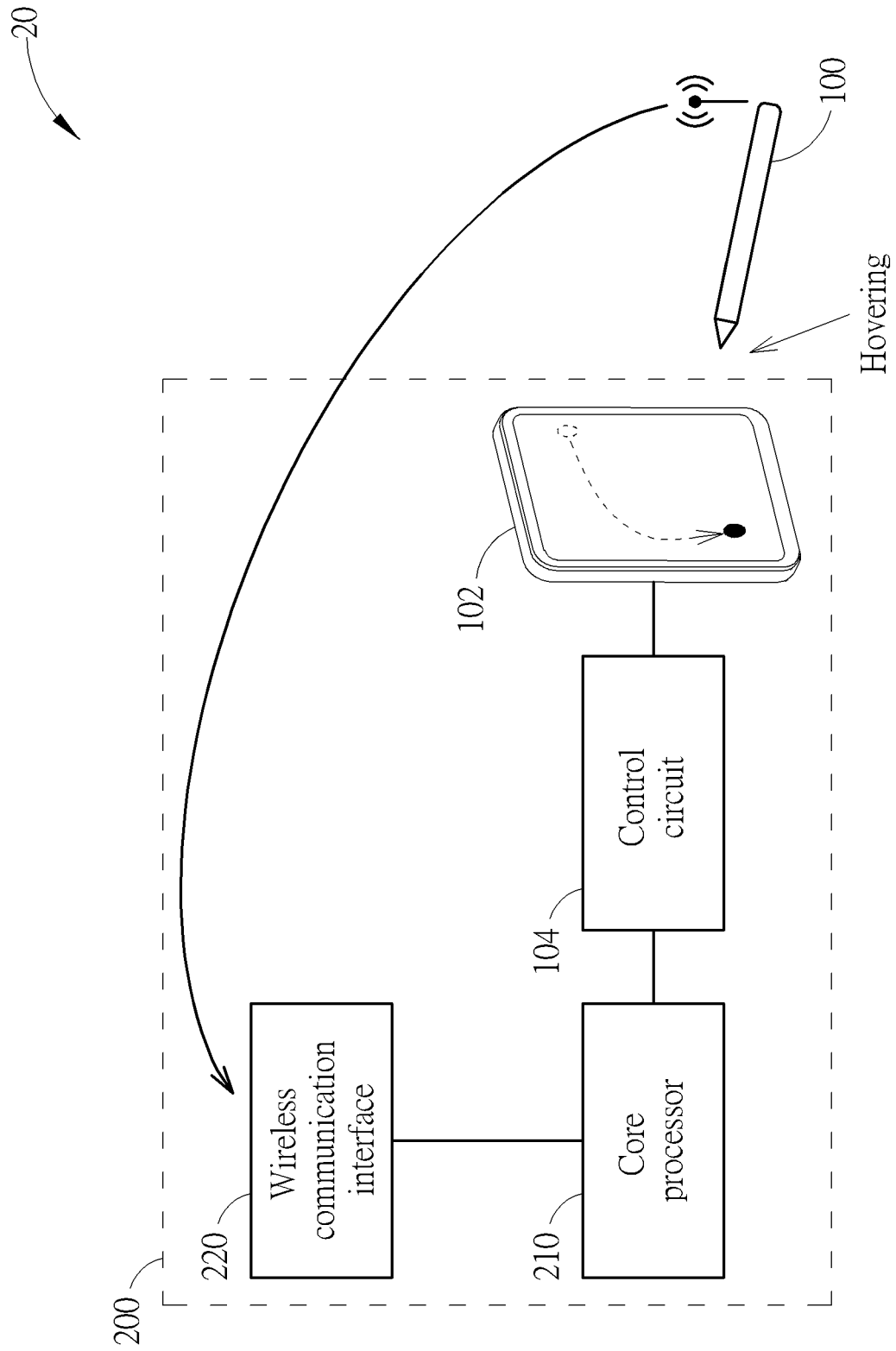
FIG. 2 illustrates a stylus control system having an electronic device in which the touch panel and the control circuit are included.

In the present invention, the control circuit 104 of the touch panel 102 may detect the active stylus 100 when the active stylus 100 is hovering, as shown in FIG. 2. FIG. 2 illustrates a stylus control system 20 having an electronic device 200 in which the touch panel 102 and the control circuit 104 are included. The electronic device 200, such as a mobile phone or a tablet computer, may interact with the active stylus 100 through the touch panel 102 and the control circuit 104. In addition, the electronic device 200 may further include a core processor 210 and a wireless communication interface 220. The core processor 210 may be a main controller or processing device, such as a central processing unit (CPU), microprocessor, or micro controller unit (MCU). The wireless communication interface 220 is coupled to and controlled by the core processor 210. The wireless communication interface 220 may be, but not limited to, a Wireless Fidelity (Wi-Fi) module or Bluetooth module.

In an embodiment, the control circuit 104 may include a stylus control circuit which is configured to control the active stylus 100 by generating positioning signals. In response, the active stylus 100 may analyze the positioning signals to obtain position information, and then send the position information to the touch panel 102 by using the downlink signals or directly to the core processor 210 through the wireless communication interface 220.

In an embodiment, the touch sensing electrodes of the touch panel 102 may form several positioning transmission electrodes for delivering the positioning signals, in a condition that the active stylus 100 does not communicate with the control circuit 104 by physically touching the touch panel 102. In such a condition, the active stylus 100 is usually hovering. For example, the touch sensing electrodes of the touch panel 102 may be divided into several groups based on their arrangements, and a group of touch sensing electrodes may serve as a positioning transmission electrode; hence, each positioning transmission electrode may be formed by one or more touch sensing electrodes. For example, multiple adjacent touch sensing electrodes may be short-circuited to form a positioning transmission electrode. Alternatively, in order to achieve a higher positioning resolution, each touch sensing electrode may serve as a positioning transmission electrode.

The control circuit 104 may generate a plurality of positioning signals having different frequencies for the positioning transmission electrodes, respectively, and the positioning transmission electrodes may transmit the positioning signals to the active stylus 100 in the condition that the active stylus 100 does not communicate with the control circuit 104 by physically touching the touch panel 102. By receiving the positioning signals with different frequencies, the active stylus 100 may analyze the received positioning signals to find out a positioning signal having the maximum received signal strength and determine the position(s) of a (or some) positioning transmission electrode which the positioning signal having the maximum received signal strength is transmitted through, according to the frequency of the positioning signal having the maximum received signal strength. According to the position(s) of the positioning transmission electrode(s) that outputs the positioning signals having the maximum received signal strength, the active stylus 100 may determine its position when it is hovering. A mapping table regarding to each positioning transmission electrode and the frequency of the positioning signal transmitted by the each positioning transmission electrode may be prestored in the active stylus 100, such that the active stylus 100 is capable of determining the position of the positioning transmission electrode according to the frequency of the received positioning signal.

In this manner, when a user takes the active stylus 100 to make a gesture in a hovering operation mode (in which the active stylus 100 does not have a physical contact with the touch panel 102), the active stylus 100 may continuously receive the positioning signals to determine a series of positions and thereby form a trajectory. The active stylus 100 then informs the electronic device 200 of its positions and/or trajectory. If the active stylus 100 is close to the surface of the touch panel 102, the active stylus 100 may transmit the position/trajectory information to the control circuit 104 by using downlink signals, which may be received by the touch sensing electrodes of the touch panel 102 and then sent to the control circuit 104. The control circuit 104 then sends the related data to the core processor 210 to report the stylus positions. If the active stylus 100 is not close enough to the touch panel 102 such that the signal strength of the downlink signals cannot be successfully sensed by the touch sensing electrodes of the touch panel 102, the active stylus 100 may send the position/trajectory information to the core processor 210 through the wireless communication interface 220.

Therefore, the core processor 210 of the electronic device 200 may obtain the positions and/or movements and/or trajectory of the active stylus 100 to determine the gesture performed by the active stylus 100, so as to realize various applications. For example, based on the moving trajectory of the active stylus 100, the electronic device 200 may perform corresponding operations such as opening an application, showing the trajectory on the screen, or performing human-computer interaction in a game.

Although the positioning signals for positioning of the active stylus 100 are transmitted from the touch panel 102 to the active stylus 100, these positioning signals are different from the uplink control signals carrying commands. In the embodiments of the present invention, the positioning signal may be a frequency signal, which only carries one or more pure frequencies without carrying any digital data or encoded commands. The frequency values of the positioning signals are only used for the active stylus 100 to determine its position. In an embodiment, the positioning signal transmitted by one positioning transmission electrode may be a single tone signal, which may be a single tone sinusoidal signal or a single tone square-wave signal, but not limited thereto. To achieve that the active stylus 100 is capable of determining the position of the positioning transmission electrode that transmits the positioning signal having the maximum received signal strength based on the frequency of the positioning signal having the maximum received signal strength, different positioning transmission electrodes may be configured to transmit the positioning signals in different frequencies, to facilitate the determination of position.

In order to differentiate the uplink control signals and the positioning signals, the uplink control signals are called uplink command signals hereinafter, so as to indicate the difference that the uplink command signals include commands while the positioning signals do not include commands.

Figure 3A:
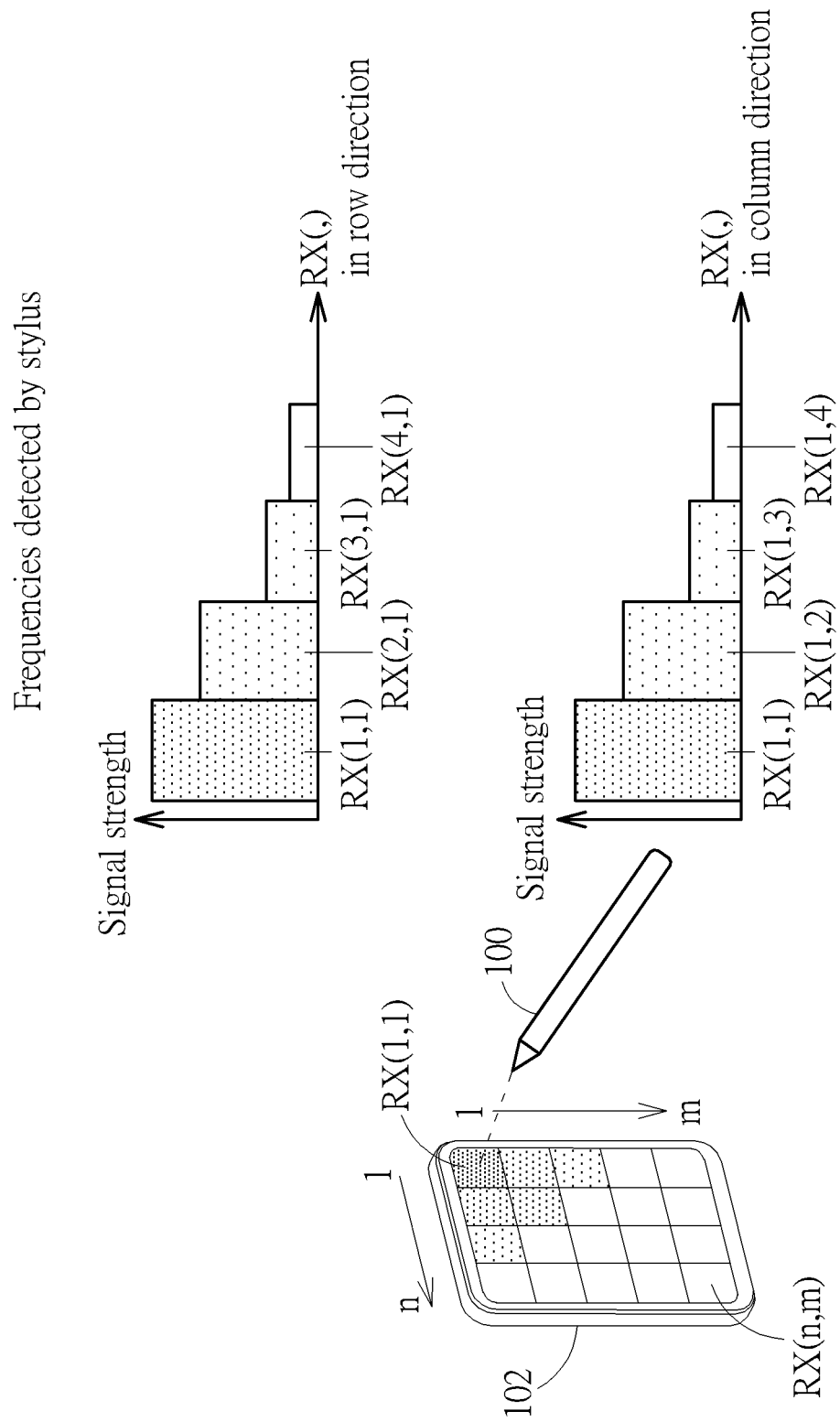
FIGS. 3A and 3B are schematic diagrams of distributions of the positioning signals detected by the active stylus according to embodiments of the present invention.
Figure 3B:
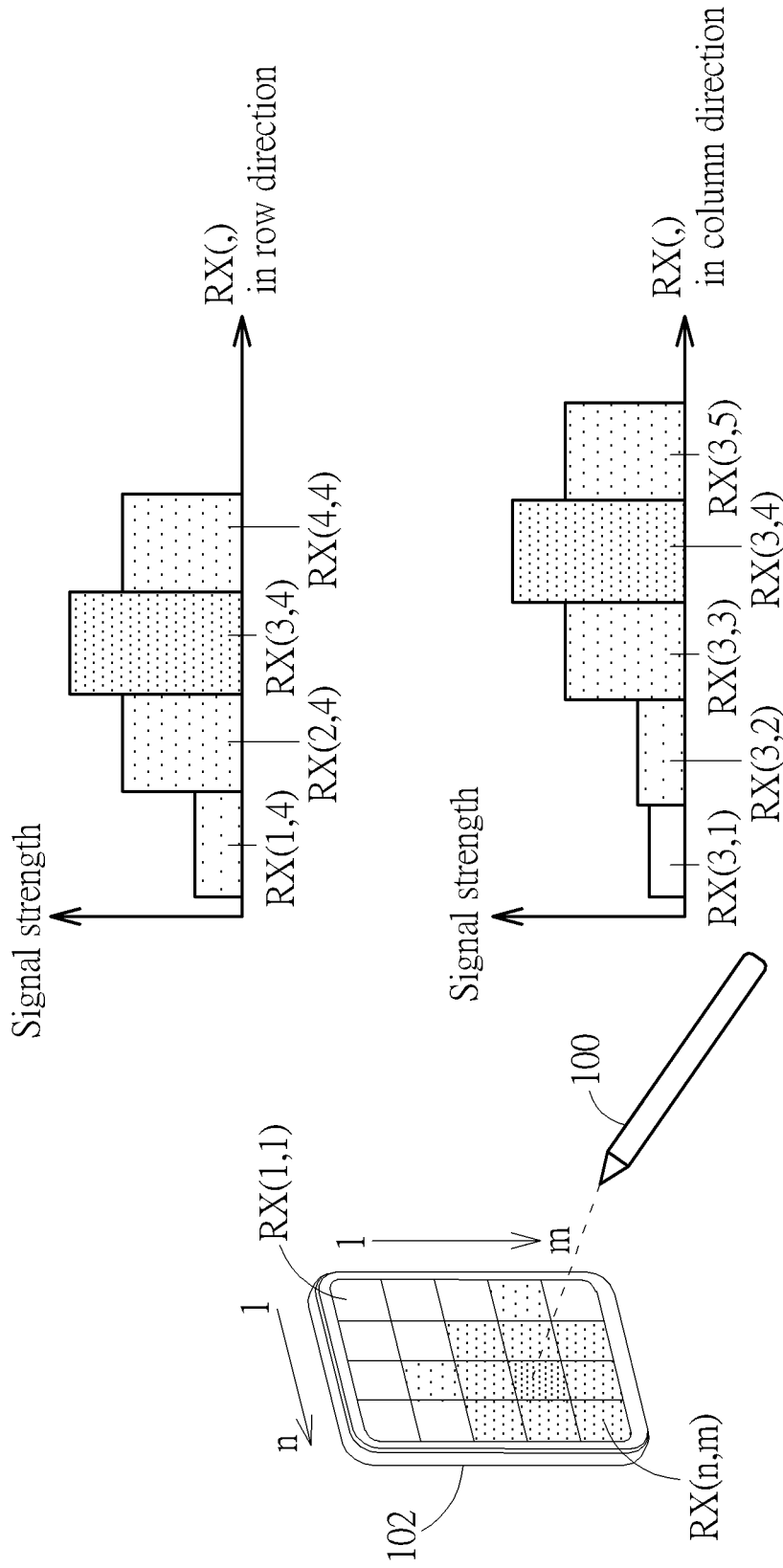

FIGS. 3A and 3B are schematic diagrams of distributions of the positioning signals detected by the active stylus 100 according to embodiments of the present invention. The touch panel 102 includes a plurality of positioning transmission electrodes deployed as an n×m array and denoted by RX(1,1)-RX(n,m). Supposing that a row of positioning transmission electrodes include n electrodes, a first (uppermost) row of positioning transmission electrodes RX(1,1)-RX(n,1) may transmit the positioning signals in different frequencies. The control circuit 104 may include a positioning signal generator for generating n×m frequencies f(1,1)- f(n,m) to be delivered to the respective positioning transmission electrodes RX(1,1)-RX(n,m).

In the embodiment of FIG. 3A, the active stylus 100 is hovering and may be mostly close to the positioning transmission electrode RX(1,1) of the touch panel 102, which means the shortest distance is between the tip of the active stylus 100 and a coordinate of the touch panel 102 which falls in the area of the positioning transmission electrode RX(1,1). Therefore, the signal strengths of the positioning signals received by the active stylus 100 may be distributed as shown in FIG. 3A, where the positioning signal transmitted by the positioning transmission electrode RX(1,1) may be analyzed by the active stylus 100 and recognized as having the maximum received signal strength, which may exceeds a default value; and the positioning signals transmitted by the positioning transmission electrodes RX(1,2), RX(2,1) and RX(2,2), which are adjacent to the positioning transmission electrode RX(1,1), may be analyzed by the active stylus 100 and recognized as having received signal strengths (no matter those strengths are the same or different) falling in a second-largest range of received signal strength. At the side of the active stylus 100, the active stylus 100 may analyze several received positioning signals and find out the one positioning signal having the maximum received signal strength among the several received positioning signals and also obtain the frequency of that positioning signal, and the active stylus 100 may determine that positioning signal is transmitted by the positioning transmission electrode RX(1,1) according to a mapping information about signal frequencies to positions of the positioning transmission electrodes.

In the embodiment of FIG. 3B, the active stylus 100 is hovering and may be mostly close to the positioning transmission electrode RX(3,4) of the touch panel 102, which means the shortest distance is between the tip of the active stylus 100 and a coordinate of the touch panel 102 which falls in the area of the positioning transmission electrode RX(3,4). Therefore, the signal strengths of the positioning signals received by the active stylus 100 may be distributed as shown in FIG. 3B, where the positioning signal transmitted by the positioning transmission electrode RX(3,4) may be analyzed by the active stylus 100 and recognized as having the maximum received signal strength, which may exceeds a default value; and the positioning signals transmitted by eight positioning transmission electrodes, which surround the positioning transmission electrode RX(3,4), may be analyzed by the active stylus 100 and recognized as having received signal strengths (no matter those strengths are the same or different) falling in a second-largest range of received signal strength.

In such a situation, the active stylus 100 may analyze the received positioning signals and find out the positioning signal which has the maximum received signal strength, and thereby determine, according to the frequency of the positioning signal having the maximum received signal strength, the position of the positioning transmission electrode. Alternatively, in order to perform positioning more accurately, the active stylus 100 may analyze the received positioning signals to determine positions of a first plurality of positioning transmission electrodes which are taken into account and perform interpolation calculation based on the positions of the first plurality of positioning transmission electrodes and signal strengths of corresponding positioning signals transmitted from the first plurality of positioning transmission electrodes.

The operations of using the uplink positioning signals to provide the frequencies (which represent the positions of the positioning transmission electrodes) for the active stylus to determine the position of the active stylus may effectively improve the sensing range of the hovering stylus. In the prior art, the distance that the downlink signals are able to propagate is quite short. Therefore, the conventional positioning method where the stylus position is determined by detecting the downlink signals through the touch sensing electrodes is feasible only if the active stylus is close to the touch panel with an extremely small distance, e.g., within 10 millimeters (mm). This limits the sensing range of the active stylus in the hovering operation. In contrast, in the embodiments of the present invention, the position information is represented by frequencies of the uplink positioning signals to be sent to the active stylus. In one embodiment, the uplink positioning signals may be generated by a circuit in the touch panel different from the circuit used for generating the uplink command signals, and design of frequencies and transmitting signal strengths of the uplink positioning signals may have flexibility and does not restricted by the design rule for the uplink command signals. In such a situation, the operation range of the active stylus in hovering may have opportunity to be significantly extended to a distance suitable for hovering gesture control.

Further note that at a distance of several tens of centimeters between the touch panel and the hovering active stylus, it may be preferable to perform hovering gesture control rather than handwriting accomplished by transmitting uplink command signals. This is because the data codes carried in the uplink command signals may not be stably received by the active stylus at such a far distance. After the active stylus determines its position when it is in hovering, the position information will be sent to the core processor through a wireless communication interface, so as to realize the far distance control.

Figure 4:
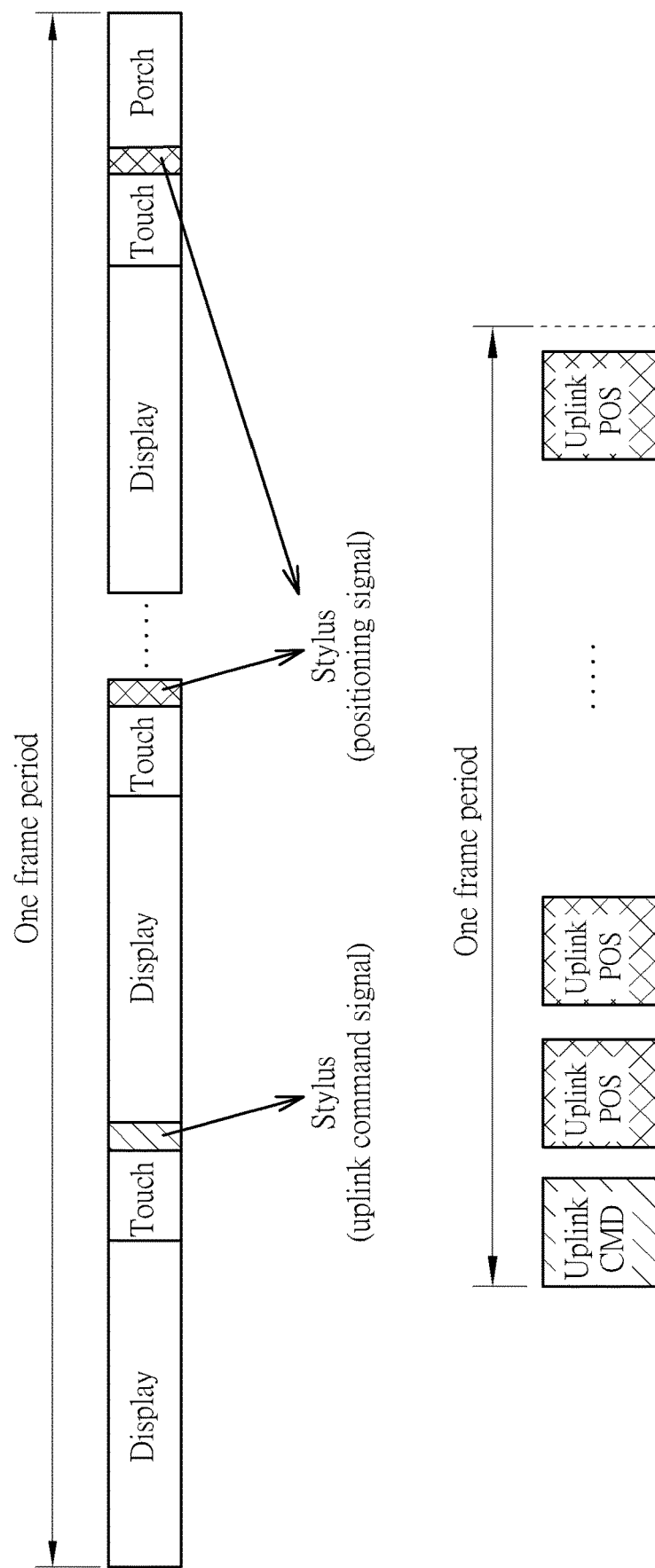
FIG. 4 is a waveform diagram of timing allocation of the touch panel in a frame period.

In general, in an in-cell touch sensing system, the operations of display, touch sensing, and stylus control are performed time-divisionally. The stylus transmission periods may be synchronized with the display frame periods, where each stylus transmission period may be allocated to uplink transmission for uplink command signals, uplink transmission for positioning signals, and/or downlink transmission in an appropriate manner. FIG. 4 is a waveform diagram of timing allocation of the touch panel in a frame period. Supposing that the touch panel operates in a display frame rate equal to 60 Hz, the frame period will equal 16.67 milliseconds (ms). As shown in FIG. 4, the display periods, the touch sensing periods and the stylus transmission periods may be alternately allocated in the frame period. In this embodiment, the stylus transmission periods in this frame period are all used for uplink transmissions (including the uplink command signals with commands and the positioning signals without commands). The downlink signals may be transmitted in the stylus transmission periods in other frame periods. In another embodiment, in one frame period, several stylus transmission periods may be allocated to uplink transmission and several stylus transmission periods may be allocated to downlink transmission. For example, if the position of the active stylus is successfully detected after one stylus transmission period for uplink transmission, other subsequent stylus transmission periods in the same frame period may be allocated to downlink transmission.

As shown in FIG. 4, in this frame period, the touch panel may transmit an uplink command signal (CMD) with commands through the touch sensing electrodes in the first stylus transmission period. At this moment, each touch sensing electrode may deliver the command signal and may not need to be combined to form a positioning transmission electrode.

In other words, the stylus transmission period configured to transmit the uplink command signal to the active stylus is earlier than other stylus transmission periods configured to transmit the positioning signal to the active stylus. After the uplink command signal is completely transmitted, the touch sensing electrodes may be short-circuited to form the positioning transmission electrodes, where different positioning transmission electrodes may be used for transmitting different frequencies. In such a situation, the touch panel may transmit the uplink positioning signals (POS) with different frequencies in the subsequent stylus transmission periods.

Figure 5:
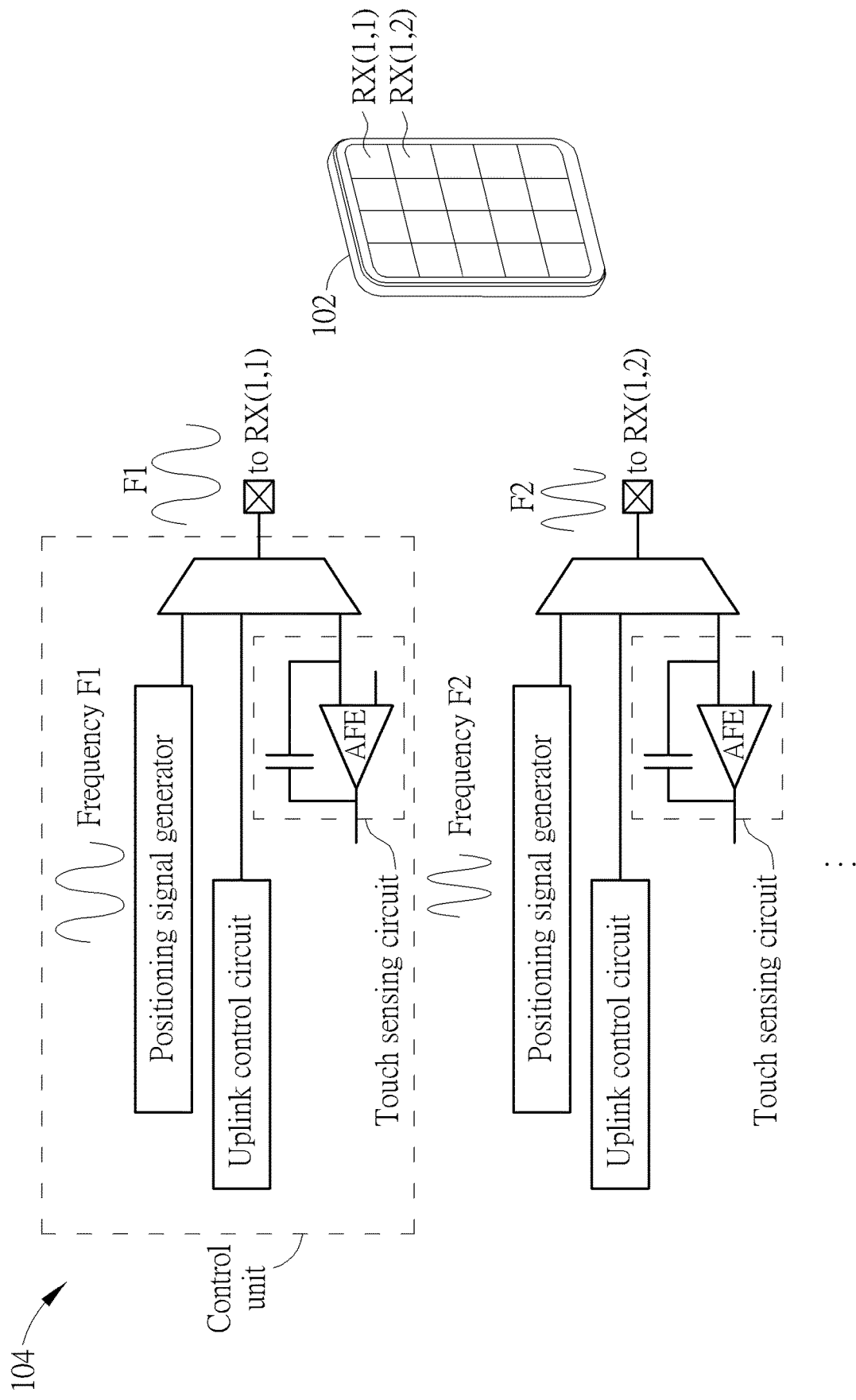
FIG. 5 illustrates a detailed implementation of the control circuit with corresponding output pads to be coupled to the positioning transmission electrodes according to an embodiment of the present invention.

FIG. 5 illustrates a detailed implementation of the control circuit 104 with corresponding output pads (i.e., output pads of an integrated circuit) to be coupled to the positioning transmission electrodes deployed on the touch panel 102 according to an embodiment of the present invention. The touch panel 102 includes an array of positioning transmission electrodes each having a corresponding coordinate (i, j), i=1~n and j=1~m. In this embodiment, there are 4×5=20 positioning transmission electrodes RX(1,1) to RX(4,5), which means n=4 and m=5.

The control circuit 104 may include multiple control units each configured to control one or more positioning transmission electrodes. In this embodiment, each control unit is configured to control a positioning transmission electrode. Each control unit may include a multiplexer (MUX), a touch sensing circuit, an uplink control circuit and a positioning signal generator. Each of the touch sensing circuit, the uplink control circuit and the positioning signal generator is coupled to one of the input terminals of the MUX, respectively. In another embodiment, the uplink control circuit may be integrated with the positioning signal generator to be coupled to the same input terminal of the MUX.

In addition, since there are 20 positioning transmission electrodes included in the touch panel 102, the control circuit 104 may include 20 control units for controlling the 20 positioning transmission electrodes, respectively. In FIG. 5, only 2 control units coupled to the positioning transmission electrodes RX(1,1) and RX(1,2) are shown for brevity.

In the control unit, the MUX is coupled between the uplink control circuit, the positioning signal generator, the touch sensing circuit and the corresponding positioning transmission electrode. The MUX is configured to control the signal transmissions of the positioning transmission electrode in different operation periods. For example, in a stylus transmission period allocated to uplink transmission, the MUX may couple the positioning transmission electrode to the uplink control circuit or the positioning signal generator; and in a stylus transmission period allocated to downlink transmission or in a touch sensing period, the MUX may couple the positioning transmission electrode to the touch sensing circuit. In an embodiment, the MUXs of the control units may scan the positioning transmission electrodes column by column, to perform finger touch control or stylus control on different positioning transmission electrodes time-divisionally.

The touch sensing circuit is configured to output touch driving signals to the corresponding touch sensing electrode and receive touch sensing signals from the corresponding touch sensing electrode. In one embodiment, a plurality of touch sensing electrodes is used to form one positioning transmission electrode, and the touch sensing circuit may be commonly used for stylus sensing and finger touch sensing. Therefore, the touch sensing circuit is further configured to receive downlink signals from an active stylus in a stylus transmission period allocated to downlink transmission. In an embodiment, the touch sensing circuit may include one or more analog front-end (AFE) circuits, as shown in FIG. 5.

The positioning signal generator is configured to generate a positioning signal having a specific frequency and transmit the positioning signal to the corresponding positioning transmission electrode of the touch panel 102 through the corresponding MUX and output pad, so that the positioning signals may be output to the active stylus 100 through the positioning transmission electrode. The positioning signal generators in different control units are configured to generate positioning signals having different frequencies. In this embodiment, there may be 20 positioning transmission electrodes on the touch panel 102, and thus 20 different frequencies may be generated by the positioning signal generators. For example, as shown in FIG. 5, the frequency F1 is generated by a positioning signal generator and provided for the positioning transmission electrode RX(1,1), the frequency F2 is generated by another positioning signal generator and provided for the positioning transmission electrode RX(1,2), and so on. The positioning signal generators generating positioning signals with different frequencies may be integrated and regarded as one positioning signal generator.

The uplink control circuit is configured to transmit uplink command signals to the corresponding touch sensing electrode of the touch panel 102 through the corresponding MUX and output pad, so that the uplink command signals may be output to the active stylus 100 through the touch sensing electrode. As mentioned above, several touch sensing electrodes may be combined to form a positioning transmission electrode. Therefore, the MUXs may be configured to couple the uplink control circuit to the target touch sensing electrode in a stylus transmission period for transmitting the uplink command signals; while being configured to couple the positioning signal generator to the target positioning transmission electrode formed by one or more touch sensing electrodes in another stylus transmission period for transmitting the positioning signals.

Instead of the uplink control circuit included in each control unit, the control circuit 104 may include a global uplink control circuit which is coupled to partial or all of the positioning transmission electrodes RX(1,1)-RX(4,5) of the touch panel 102. In such a situation, in a stylus transmission period for transmitting the uplink command signals such as the first stylus transmission period shown in FIG. 4, the global uplink control circuit may transmit the uplink command signals to partial or all of the positioning transmission electrodes RX(1,1)-RX(4,5). Subsequently, in a stylus transmission period for transmitting the positioning signals such as the follow-up stylus transmission periods shown in FIG. 4, the positioning signals having different frequencies may be simultaneously transmitted to the corresponding positioning transmission electrodes.

In this embodiment, the positioning signal generator is integrated with the touch sensing circuit in the same control unit. In general, the touch sensing circuit may be coupled to a row of touch sensing electrodes, to scan the touch sensing operations row by row through controls of the MUX, which means that the corresponding positioning signal generator may output the positioning signal having the same frequency to one or more positioning transmission electrodes composed of the row of touch sensing electrodes.

Figure 6:
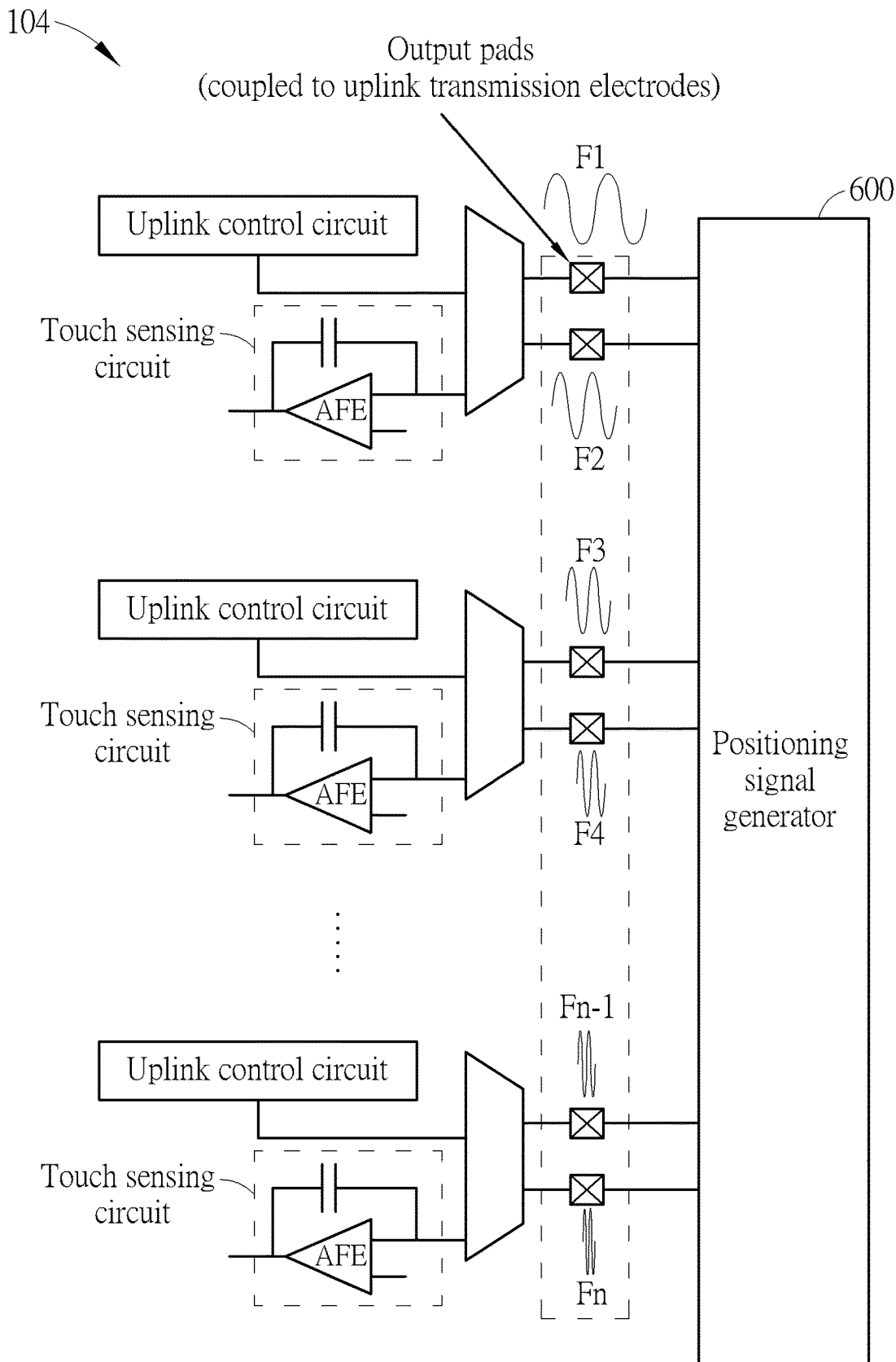
FIG. 6 illustrates another detailed implementation of the control circuit with corresponding output pads to be coupled to the positioning transmission electrodes according to an embodiment of the present invention.

In order to improve the flexibility of frequency configuration of the positioning signals, in another embodiment, the positioning signal generator may be coupled to the output pads and corresponding positioning transmission electrodes without through any MUXs. FIG. 6 illustrates another detailed implementation of the control circuit 104 with corresponding output pads to be coupled to the positioning transmission electrodes according to an embodiment of the present invention. Different from FIG. 5 where a positioning signal generator is included in each control unit to be coupled to the positioning transmission electrode through a MUX, in the embodiment shown in FIG. 6, the control circuit 104 includes a positioning signal generator 600, which is coupled to output pads without through any MUXs, and through the output pads the positioning signal generator 600 is coupled to multiple positioning transmission electrodes. In this embodiment, the positioning signal generator 600 is able to generate different positioning signals having different frequencies (e.g., F1-Fn) to be transmitted through different positioning transmission electrodes.

For example, the positioning signal generator 600 may be cooperated with a touch panel where 18×32=576 touch sensing electrodes are deployed and each touch sensing electrode serves as a respective positioning transmission electrode without combination. The positioning signal generator 600 may output the positioning signals having at most 576 different frequencies to the 576 positioning transmission electrodes, respectively, wherein each touch sensing electrode is operated as a positioning transmission electrode. In another embodiment, the positioning signal generator 600 may output the positioning signals having 48 different frequencies to the 6×8=48 positioning transmission electrodes, respectively, wherein every 3×4 touch sensing electrodes in a combination is operated as a positioning transmission electrode.

Therefore, in the structure as shown in FIG. 6, each control unit may only include a MUX, an uplink control circuit and a touch sensing circuit, where the uplink control circuit and the touch sensing circuit are selectively coupled to the output pad through MUX control. In addition, since the MUXs are coupled to the corresponding uplink control circuits and touch sensing circuits while the positioning signal generator 600 is coupled to the positioning transmission electrodes without through any MUXs, when the positioning signal generator 600 transmits the positioning signals, the output of the MUXs may be disconnected or open.

Figure 7:
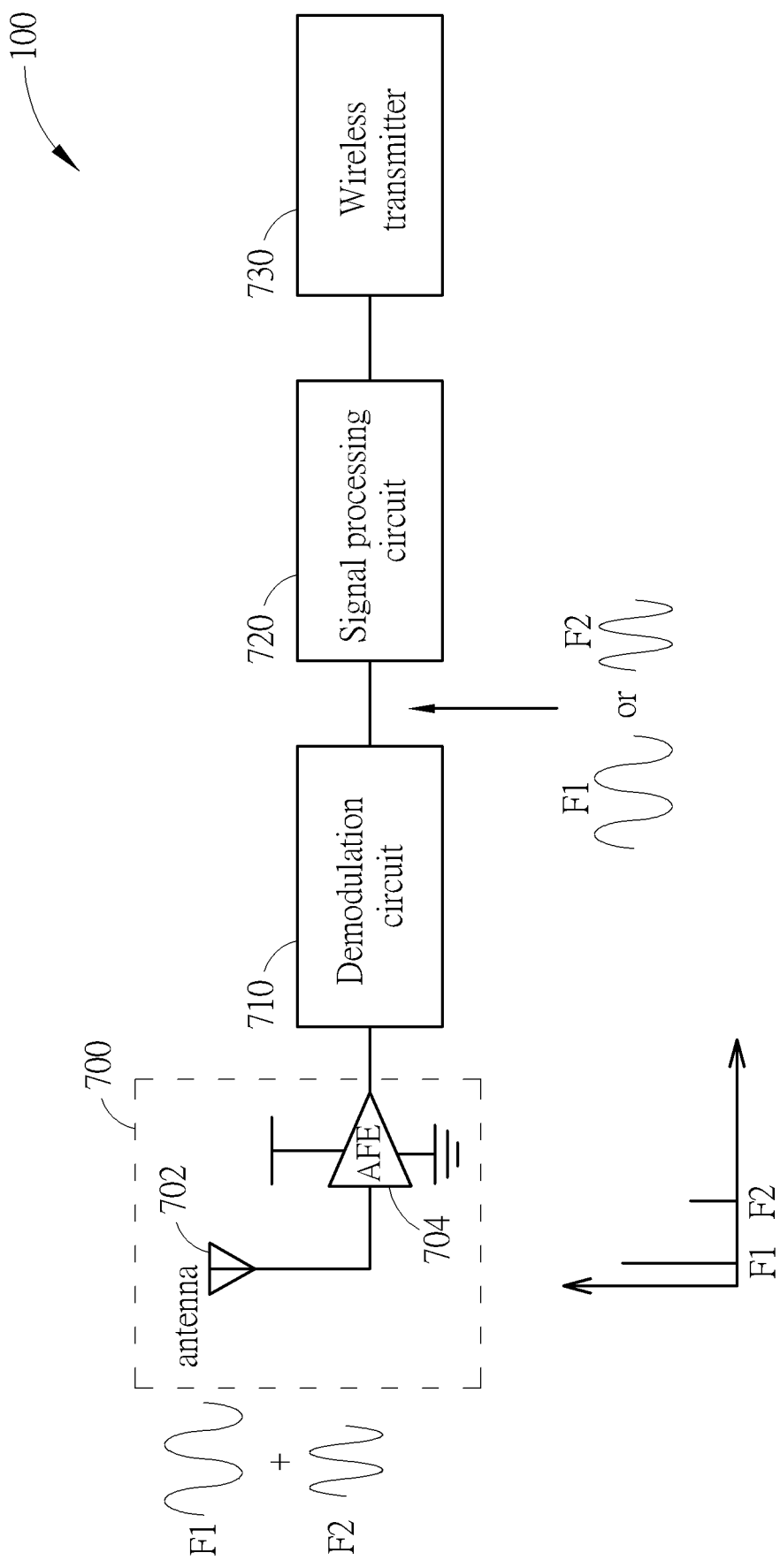
FIG. 7 illustrates a detailed implementation of the active stylus according to an embodiment of the present invention.

FIG. 7 illustrates a detailed implementation of the active stylus 100 according to an embodiment of the present invention. The active stylus 100 includes a receiver 700, a demodulation circuit 710, a signal processing circuit 720 and a wireless transmitter 730.

The receiver 700 is configured to receive an uplink signal transmitted from the electrodes of the touch panel 102. The uplink signal may carry the positioning signals having frequency components only, and/or carry the uplink command signals having commands. As shown in FIG. 7, the receiver 700 may include an antenna 702 and an AFE circuit 704. The antenna 702 may be an electrode deployed on or near the tip of the active stylus 100. After the antenna 702 receives the uplink signal, the AFE circuit 704 may perform analog processing on the uplink signal, such as amplifying and/or filtering the signal, and/or removing unwanted noises in the signal. The antenna 702 may also be configured to transmit downlink signals to the touch panel 102. In an embodiment, the antenna 702 may serve as a transmitter for transmitting the position information of the active stylus 100 to the touch sensing electrodes of the touch panel 102.

The demodulation circuit 710 is configured to demodulate the uplink signal to recover the positioning signals. For example, if the uplink signal received by the active stylus 100 includes the positioning signals having two frequencies F1 and F2, the demodulation circuit 710 may recover one positioning signal having the frequency F1 or F2.

The signal processing circuit 720 is configured to process the uplink signal. If the received uplink signal is an uplink command signal, the signal processing circuit 720 may obtain the commands included in the uplink command signal and perform any operations instructed by the commands, such as changing the operation mode. In an embodiment, the commands are carried in the uplink command signal in form of encoded data; hence, the signal processing circuit 720 may include a decoder for decoding the data to obtain the message of the commands. If the received uplink signal includes positioning signals, the signal processing circuit 720 may obtain the information of frequencies and strengths carried in the positioning signals from the demodulation circuit 710, and analyze said information to determine the frequency components contained in the positioning signals and also determine the signal strength of each frequency component. The signal processing circuit 720 then determines the position of the active stylus 100 accordingly. For example, the signal processing circuit 720 may obtain the frequencies of all positioning signals transmitted from the touch panel 102, and determine the frequency of a positioning signal having the maximum received signal strength is transmitted by which positioning transmission electrode, so as to determine the coordinate of the active stylus 100. Alternatively, based on the frequencies of two or more positioning signals having the maximum received signal strength or in the second-largest range of received signal strength, the signal processing circuit 720 may determine these positioning signals are transmitted by which positioning transmission electrodes, and calculate the coordinate of the active stylus 100 according to the positions of these positioning transmission electrodes, e.g., through interpolation.

The wireless transmitter 730 is configured to transmit the position information of the active stylus 100 to the control circuit 104 or the core processor 210 of the electronic device 200 through the wireless communication interface 220. As mentioned above, the wireless communication interface 220 may be a Wi-Fi module or Bluetooth module capable of wireless transmission functions. Correspondingly, the wireless transmitter 730 may be a Wi-Fi transmitter or Bluetooth transmitter to be adapted to the communication protocol of the wireless communication interface 220.

Note that the uplink signal composed of the positioning signals may be demodulated by the demodulation circuit 710 in various manners. If the demodulation circuit 710 includes multiple demodulators, or if the active stylus 100 includes multiple demodulation circuits, these demodulators or demodulation circuits may demodulate the uplink signal in parallel, to obtain different positioning signals simultaneously. For example, supposing that the demodulation circuit 710 has two demodulators, a first demodulator may demodulate the uplink signal to recover a first positioning signal having the frequency F1, and a second demodulator may demodulate the uplink signal to recover a second positioning signal having the frequency F2. The first demodulator and the second demodulator may operate simultaneously to obtain the strengths of different positioning signals having different frequencies. Alternatively, if there is only one demodulation circuit 710 (or one demodulator) included in the active stylus 100, this demodulation circuit 710 can only demodulate to obtain the strength of a single tone signal (i.e., one positioning signal) in an operation period such as a stylus transmission period or a frame period. In such a situation, the demodulation circuit 710 is requested to demodulate to obtain all the frequency components in the received positioning signals and their signal strengths in multiple operation periods.

Figure 8:
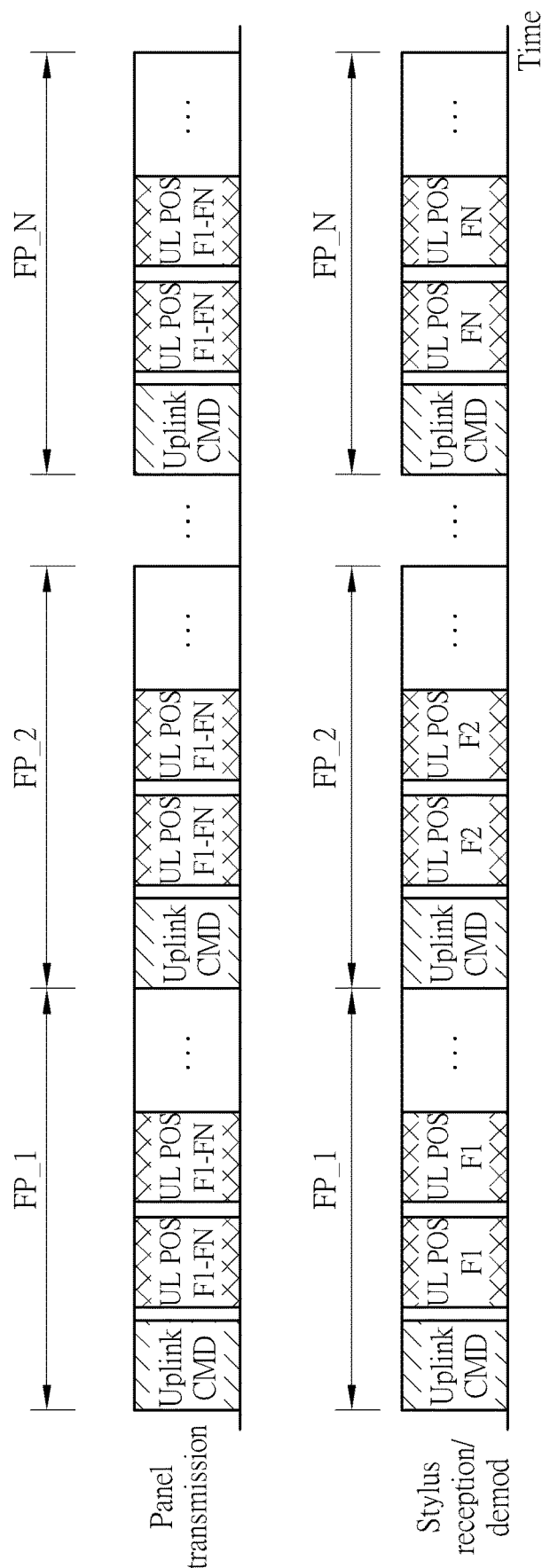
FIG. 8 is a waveform diagram of timing allocation of transmissions between the touch panel and the active stylus in several frame periods according to an embodiment of the present invention.

FIG. 8 is a waveform diagram of timing allocation of transmissions between the touch panel 102 and the active stylus 100 in several frame periods FP_1-FP_N according to an embodiment of the present invention. Referring to FIG. 8 along with FIG. 4, each time slot shown in FIG. 8 may be a stylus transmission period of a frame period. Note that the stylus transmission periods in the frame periods FP_1-FP_N are used for uplink transmission, while the downlink transmission may be performed in other frame periods (not shown).

In the first stylus transmission period of each frame period, the touch panel 102 may transmit the uplink command signal (CMD) carrying commands, where the uplink command signal is received by the receiver 700 of the active stylus 100, and then processed by the signal processing circuit 720. In the follow-up stylus transmission periods of each frame period, the touch panel 102 may transmit the positioning signals (UL POS) as the uplink signal, which is received by the receiver 700 of the active stylus 100 and then sent to the demodulation circuit 710. In this embodiment, the uplink signal may include the positioning signals having frequencies from F1 to FN, and may be repeatedly transmitted in the N consecutive frame periods FP_1-FP_N. The demodulation circuit 710 may demodulate the uplink signal to recover the positioning signal having the frequency F1 and obtain its signal strength in the first frame period FP_1, demodulate the uplink signal to recover the positioning signal having the frequency F2 and obtain its signal strength in the second frame period FP_2 . . . , and demodulate the uplink signal to recover the positioning signal having the frequency FN and obtain its signal strength in the last frame period FP_N.

As a result, although multiple positioning signals having different frequencies are simultaneously transmitted through the positioning transmission electrodes, these positioning signals may be demodulated and recovered time-divisionally or simultaneously based on the structure and configuration of the demodulation circuit(s) included in the active stylus.

In a practical example, there may be 18×32=576 touch sensing electrodes deployed on the touch panel 102 and each touch sensing electrode may serve as a respective positioning transmission electrode without combination. In an uplink transmission period for the positioning signals, the touch panel 102 may transmit 576 positioning signals having different frequencies through the 576 positioning transmission electrodes, respectively and simultaneously. Correspondingly, the active stylus 100 receives an uplink signal containing these 576 positioning signals. Under the above situation, in an embodiment, the demodulation circuit 710 of the active stylus 100 may include 576 demodulators; hence, the demodulation circuit 710 may demodulate the uplink signal to generate the 576 positioning signals and obtain their signal strengths in one operation period. In another embodiment, in order to save the circuit costs, the number of demodulators included in the demodulation circuit 710 may be fewer than the number of positioning signals carried in the received uplink signal; hence, the demodulation circuit 710 may demodulate the uplink signal time-divisionally, to obtain the 576 positioning signals and their signal strengths in several operation periods. In an extreme embodiment, the demodulation circuit 710 includes only one demodulator; hence, the demodulation circuit 710 may demodulate the uplink signal by 576 times to obtain the entire frequency data.

Please note that the frame period may equal 16.67 ms, which is quite short as compared to the moving speed of the active stylus. Therefore, it is impossible to move the active stylus through one unit distance (i.e., the size of a positioning transmission electrode) within a frame period. In such a situation, the active stylus may determine its position or coordinate in every frame period or every few frame periods. The frequency of determining the stylus position may be adjusted based on the gesture of the active stylus and/or practical applications.

In addition, according to the positioning signals received by the active stylus 100 in several consecutive frame periods, the signal processing circuit 720 may further determine the trajectory of the active stylus 100. Further, since the present invention is applicable to a hovering operation, the signal processing circuit 720 may calculate the strength variations of the positioning signal(s) having one or more specific frequencies, so as to determine that the active stylus 100 is approaching the panel or departing from the panel. The trajectory information may be transmitted to the core processor 210 of the electronic device 200 as shown in FIG. 2 by using the downlink signals or through the wireless communication interface 220.

Please note that the present invention aims at providing a novel stylus control circuit for positioning of a hovering stylus. Those skilled in the art may make modifications and alterations accordingly. For example, in the above embodiments, the touch panel may interact with an active stylus to realize the positioning of the active stylus. Note that the present invention may be applied to another type of stylus or touch pen. As long as the stylus is capable of receiving uplink positioning signals and demodulating the uplink signals to obtain the frequency components of the positioning signals so as to realize the positioning of the stylus, the related implementations should belong to the scope of the present invention.

In addition, in the above embodiments, the touch panel 102 may transmit the positioning signals to the active stylus 100 through all positioning transmission electrodes simultaneously, but not limited thereto. In another embodiment, the transmissions of uplink positioning signals may be performed flexibly under different applications, where the touch panel 102 may transmit the uplink signal composed of different numbers or different combinations of positioning signals in different time periods. For example, the touch panel 102 may transmit the positioning signals only through the positioning transmission electrodes in odd columns or odd rows in the frame period N, and then transmit the positioning signals only through the positioning transmission electrodes in even columns or even rows in the frame period N+1. In such a situation, the uplink signals transmitted in these two frame periods may have different frequency components.

To sum up, the present invention provides a stylus control circuit and a stylus which communicate with each other in a hovering operation mode. Conventionally, since the downlink signal strengths from the stylus received at the touch panel are quite weak when the stylus is hovering, the stylus should be extremely close to the touch panel so as to realize the position detection. In contrast, according to embodiments of the present invention, the touch panel transmits uplink positioning signals to the stylus to perform positioning, to realize far-distance hovering control. In an embodiment, the touch panel may be deployed with an array of positioning transmission electrodes which may be formed by touch sensing electrodes, where each positioning transmission electrode may output a positioning signal having a specific frequency, and different positioning transmission electrodes correspond to different frequencies. Therefore, the stylus may receive the positioning signals composed of multiple frequencies, and demodulate the positioning signals to obtain the signal strength in each frequency. In this manner, the stylus may find that the frequency of a positioning signal having the maximum received signal strength is transmitted by which positioning transmission electrode, so as to determine the coordinate of the hovering stylus. The stylus then sends the coordinate/position information to the touch panel by using downlink signals or through another wireless transmission interface such as Wi-Fi or Bluetooth, so as to realize the positioning of the stylus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stylus control circuit to control a stylus, the stylus control circuit comprising:
    a positioning signal generator to generate a first positioning signal having a first frequency and transmit the first positioning signal to the stylus through a first positioning transmission electrode in a second stylus transmission period which is after a first stylus transmission period for transmitting an uplink command signal;
    an uplink control circuit, configured to transmit the uplink command signal during the first stylus transmission period; and
    a plurality of multiplexers, each coupled to the positioning signal generator and the first positioning transmission electrode, to control the stylus control circuit to selectively output the first positioning signal, the uplink command signal, or a touch driving signal;
    wherein the first frequency corresponds to a position of the first positioning transmission electrode;
    wherein the first positioning signal is a frequency signal without carrying any digital data;
    wherein the stylus control circuit is used to receive a position information of the stylus from the stylus through a wireless communication interface or through at least one of a plurality of touch sensing electrodes, wherein the position information is generated in response to the first positioning signal.

2. The stylus control circuit of claim 1, wherein the first positioning signal is a single tone signal.

3. The stylus control circuit of claim 1, wherein the first positioning transmission electrode is formed by at least one of the plurality of touch sensing electrodes of a touch panel.

4. The stylus control circuit of claim 3, further comprising:
    a plurality of touch sensing circuits, each used to output the touch driving signal to and receive a touch sensing signal from a corresponding one of the plurality of touch sensing electrodes of the touch panel.

5. The stylus control circuit of claim 1, wherein the positioning signal generator is further used to generate a second positioning signal having a second frequency different from the first frequency and transmit the second positioning signal to the stylus through a second positioning transmission electrode different from the first positioning transmission electrode.

6. The stylus control circuit of claim 1, wherein the uplink control circuit transmits the uplink command signal to the stylus through one or more touch sensing electrodes.

7. The stylus control circuit of claim 1, wherein a plurality of positioning signals are simultaneously output through a plurality of positioning transmission electrodes.

8. The stylus control circuit of claim 1, wherein the first positioning signal is transmitted by the positioning signal generator when the stylus is in a hovering operation mode.

* * * * *